(12) United States Patent
Pan et al.

(10) Patent No.: US 7,539,238 B2
(45) Date of Patent: May 26, 2009

(54) EXTENDED ALGORITHM DATA ESTIMATOR

(75) Inventors: Jung-Lin Pan, Selden, NY (US); Yuejin Huang, Holbrook, NY (US); Ariela Zeira, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 12/173,163

(22) Filed: Jul. 15, 2008

(65) Prior Publication Data

US 2008/0267321 A1    Oct. 30, 2008

Related U.S. Application Data

(63) Continuation of application No. 10/657,435, filed on Sep. 8, 2003, now Pat. No. 7,408,978.

(60) Provisional application No. 60/409,973, filed on Sep. 9, 2002.

(51) Int. Cl.
*H04L 27/06* (2006.01)
*H04B 1/707* (2006.01)

(52) U.S. Cl. ..................... 375/149; 375/340

(58) Field of Classification Search .................. 375/140, 375/146, 149, 150, 260, 340, 348; 370/320, 370/335, 342, 441
See application file for complete search history.

(56) References Cited

U.S. PATENT DOCUMENTS 6,690,660 B2   2/2004   Kim et al.
6,741,653 B2   5/2004   Kim et al.
6,831,944 B1   12/2004  Misra et al.
6,885,654 B2   4/2005   Pan et al.
7,408,978 B2 * 8/2008   Pan et al. ..................... 375/150
2007/0253496 A1 * 11/2007 Giannakis et al. ........... 375/260

FOREIGN PATENT DOCUMENTS

WO         02/39610        5/2002

OTHER PUBLICATIONS

Golub et al., "Matrix Computations," Baltimore, MD: The John Hopkins University Press, pp. 142-145 and pp. 188-191, 1989.
Klein et al., "Zero Forcing and Minimum Mean-Square-Error Equalization for Multiuser Detection in Code-Division Multiple Access Channels," IEEE Trans. Veh. Technol., vol. 45, May 1996, pp. 276-287.
Klein, "Data Detection Algorithms Specially Designed for the Downlink of CDMA Mobile Radio Systems," IEEE 47th Vehicular Technology Conference, May 1997, pp. 203-207.
Whalen, *Detection of signals in noise*, New York, Academic Press, 1971.

* cited by examiner

*Primary Examiner*—Don N Vo
(74) *Attorney, Agent, or Firm*—Volpe and Koenig, P.C.

(57) ABSTRACT

A method of data estimation for a Time Division Duplex (TDD) Code Division Multiple Access (CDMA) system or any other system using an extended algorithm (EA) in preference to a truncated algorithm (TA). The EA avoids implementation errors by choice of proper extended matrices, and accepts the use of one piece of hardware. The EA also obviates loss of multiple signals in the tail part of each data field, and avoids errors due to transformation of a Toeplitz matrix to a circulant matrix.

6 Claims, 8 Drawing Sheets

| FIG. 2A |
|---|
| FIG. 2B |
| FIG. 2C |

EXTENDED ALGORITHM DATA ESTIMATOR

CROSS REFERENCE TO RELATED APPLICATIONS

This application is a continuation of U.S. patent application Ser. No. 10/657,435, filed on Sep. 8, 2003, which issued as U.S. Pat. No. 7,408,978 on Aug. 5, 2008, which claims the benefit of U.S. Provisional Application No. 60/409,973, filed on Sep. 9, 2002, which are incorporated by reference as if fully set forth.

FIELD OF INVENTION

The invention generally relates to data estimation for wireless communication systems. More particularly, the invention relates to an extended algorithm (EA) for data estimation in such systems.

BACKGROUND

In some proposed wireless systems, data is wirelessly transmitted block by block with a separation interval between successive blocks. This property permits the application of joint detection (JD) in receivers to suppress the inter-symbol interference (ISI) and multiple-access interference (MAI). Single user detectors (SUDs) are used to estimate data of signals that go through a single downlink channel. An advantage of the SUD is that it can be implemented efficiently by fast Fourier transform (FFT), based on the rationale that a square Toeplitz matrix can be approximated as a circulant counterpart of the same size.

When Toeplitz matrices are shortened along their longer dimensions to square matrices and replaced with their circulant counterparts, an approximation error is introduced. This error is most prevalent in the head and tail portions of the matrix. In many systems, the data associated with the head and tail portions carries system information required by the receivers, such as power control bits and the transport format combination indicator (TFCI) in the proposed third generation partnership project (3GPP) wideband code division multiple access (WCDMA) time division duplex (TDD) system. It is desirable to enhance data estimation in such systems.

SUMMARY

The present invention provides a computationally efficient and accurate implementation of a data estimator for systems, such as Frequency Division Duplex (FDD) or Time Division Duplex (TDD) Code Division Multiple Access (CDMA) systems. Described herein is a method of implementing a data estimator wherein no data of interest for estimation will be affected significantly by the circular approximation error. To achieve this, all of the square circulant matrices are extended. The advantages of the extended approach arise from two aspects: (1) the avoidance of loss of multipath signals in the tail part of each data field and (2) the avoidance of error due to the Toeplitz to circulant matrix transformation. As a result, longer discrete Fourier Transforms (DFTs) or FFTs are performed when implementing the EA. In order to minimize the required computations with DFT, the extended sizes should preferably be limited dynamically to their lower bounds according to specific data block length and channel delay spread. However, if prime factor algorithm (PFA) is used, increasing the FFT length usually does not result in the increase of computational complexity. It is to be noted that the computations can be minimized through choosing a proper FFT length in a certain range. In this case, fixed single-length FFTs are desirable by considering the longest block length and delay spread. The single-length FFT with PFA makes it possible that different lengths of data block (burst types) are supported by one algorithm only. This simplifies the implementation further since one piece of hardware is needed to cope with the single algorithm.

BRIEF DESCRIPTION OF THE DRAWINGS

A more detailed understanding of the invention may be had from the following description of preferred embodiments given by way of example only and to be understood with reference to the accompanying drawing wherein.

DETAILED DESCRIPTION

Figure 1:
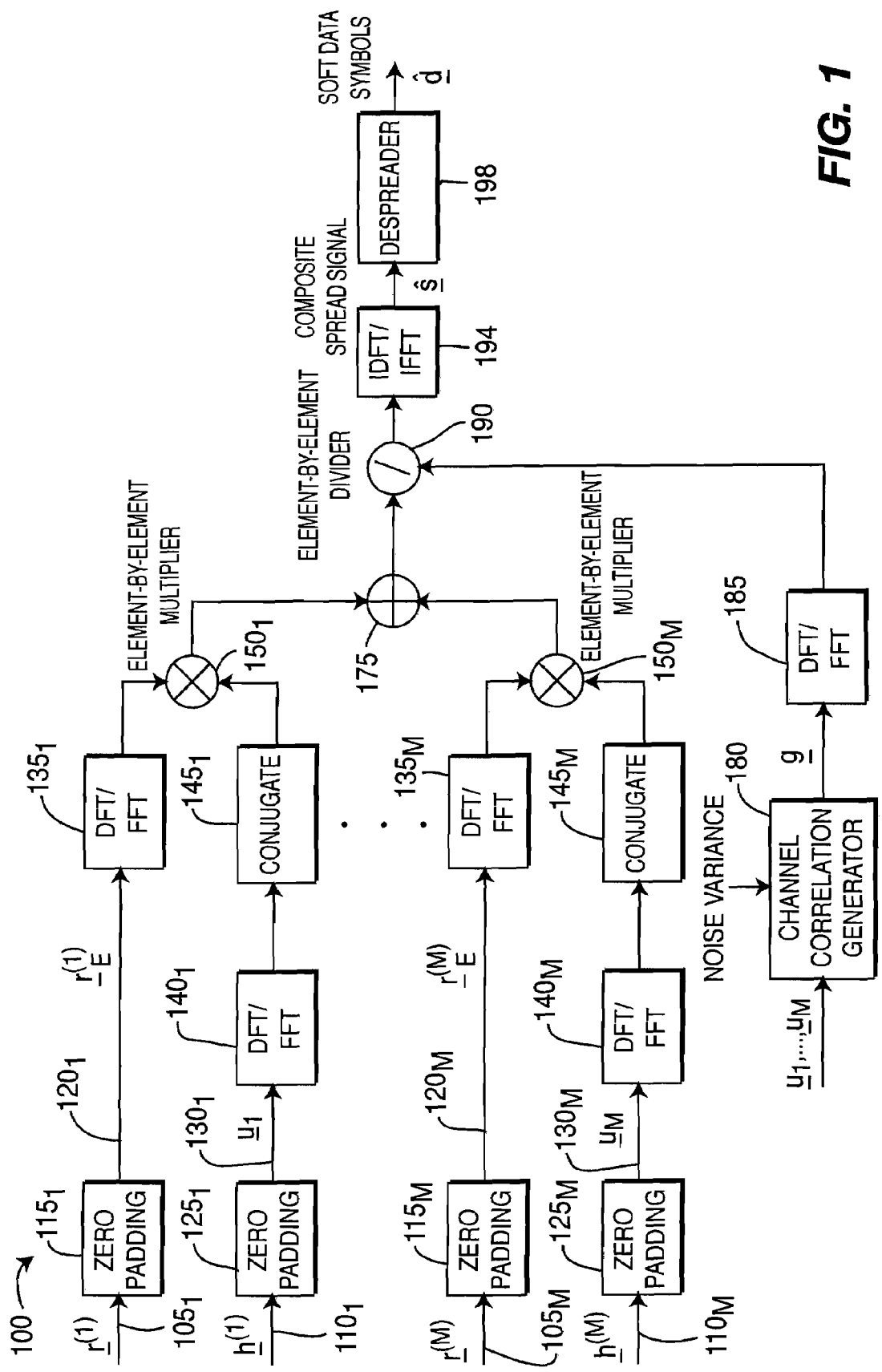
FIG. 1 is a block diagram of a system used for implementing an EA with over-sampling in accordance with a preferred embodiment of the present invention.

The invention is generally applicable for data estimation in CDMA systems, such as 3GPP TDD mode and time division synchronous code division multiple access (TD-SCDMA). However, the following description, as an example, refers to a TDD CDMA system model and algorithm. In the described example, if a composite spread signal is sent from one transmitter site to one reception site, the received signal, $\underline{r}$, is composite spread signal, $\underline{s}$, passed through a single channel, $\underline{H}$. $\underline{H}$ is the channel response matrix. This process can be represented as $\underline{r} = \underline{H}\underline{s} + \underline{n}$, where $\underline{n}$ is the noise vector. With W being the length of channel response, $\underline{H}$ takes the form per Equation 1.

$$\underline{H} = \begin{bmatrix} h_0 & & & & & \\ h_1 & h_0 & & & & \\ \ldots & h_1 & \ldots & & & \\ \ldots & \ldots & \ldots & \ldots & & \\ h_{W-1} & \ldots & & \ldots & & \\ & h_{W-1} & & \ldots & \ldots & \\ & & \ldots & & \ldots & \ldots \\ & & & \ldots & & \ldots & h_0 \\ & & & & \ldots & & h_1 \\ & & & & & \ldots & \ldots \\ & & & & & & \ldots \\ & & & & & & h_{W-1} \end{bmatrix} \quad \text{Equation 1}$$

$\underline{H}$ is of size (L+W−1) by L. L denotes the number of chips in the time period of interest, such as a data field (block). The composite spread signal $\underline{s}$ can be expressed as $\underline{s}=C\underline{d}$, where the symbol vector $\underline{d}$ and the code matrix C take the form per Equation 2.

$$\underline{d}=(d_1,d_2,\ldots,d_{KN_S})^T \qquad \text{Equation 2}$$

T denotes the transposition and C is per Equation 3.

$$C=[\underline{C}^{(1)},\underline{C}^{(2)},\ldots,\underline{C}^{(K)}] \qquad \text{Equation 3}$$

Each $C^{(k)}$ is per Equation 4.

$$\underline{C}^{(k)} = \begin{bmatrix} c_1^{(k)} & & & \\ \ldots & & & \\ c_Q^{(k)} & & & \\ \ldots & c_1^{(k)} & & \\ & \ldots & & \\ & c_Q^{(k)} & \ldots & \\ & & \ldots & \\ & & \ldots & \\ & & \ldots & c_1^{(k)} \\ & & & \ldots \\ & & & c_Q^{(k)} \end{bmatrix} \qquad \text{Equation 4}$$

Q, K, and $N_S$ (=L/Q) denote the spread factor (SF), the number of active codes, and the number of symbols carried on each channelization code, respectively.

The SUD comprises two stages: (a) channel equalization and (b) de-spreading. In the first stage, the composite spread signal $\underline{s}$ is estimated from $\underline{r}=\underline{H}\underline{s}+\underline{n}$, preferably through a minimum mean squared error (MMSE) equalizer or a zero forcing solution.

A MMSE equalizer is per Equation 5.

$$\hat{\underline{s}} = [R_H + \sigma^2 I]^{-1}\underline{H}^H\underline{r} \qquad \text{Equation 5}$$
$$= [R_H + \sigma^2 I]^{-1}R_H\underline{s} + [R_H + \sigma^2 I]^{-1}\underline{H}^H\underline{n},$$

A zero forcing solution is per Equation 6.

$$\hat{\underline{s}}=R_H^{-1}\underline{H}^H\underline{r}, \qquad \text{Equation 6}$$

I is the identity matrix, $R_H=\underline{H}^H\underline{H}$ is a square Toeplitz matrix of size L, per Equation 7.

$$R_H = \begin{bmatrix} R_0 & R_1 & \ldots & R_{W-1} & 0 & 0 & \ldots & & & & 0 \\ R_1^* & R_0 & \ldots & & R_{W-1} & 0 & \ldots & & & & \\ & R_1^* & \ldots & R_1 & & R_{W-1} & \ldots & 0 & & & \\ R_{W-1}^* & & \ldots & R_0 & R_1 & & \ldots & 0 & 0 & & \\ 0 & R_{W-1}^* & & R_1^* & R_0 & \ldots & & R_{W-1} & 0 & & \\ 0 & 0 & \ldots & & R_1^* & \ldots & \ldots & & R_{W-1}^* & \ldots & 0 & \ldots \\ \ldots & 0 & \ldots & R_{W-1}^* & & \ldots & \ldots & R_1 & & \ldots & 0 & 0 \\ & & \ldots & 0 & R_{W-1}^* & & \ldots & R_0 & R_1 & \ldots & R_{W-1}^* & 0 \\ & & & 0 & 0 & R_{W-1}^* & & R_1^* & R_0 & \ldots & & R_{W-1}^* \\ & & & & 0 & 0 & \ldots & & R_1^* & \ldots & R_1 & \\ & & & & & 0 & \ldots & R_{W-1}^* & & \ldots & R_0 & R_1 \\ 0 & & & & & & \ldots & 0 & 0 & R_{W-1}^* & \ldots & R_1^* & R_0 \end{bmatrix} \qquad \text{Equation 7}$$

'*' denoting the conjugate operation. In the second stage, a simple de-spreading process is performed to estimate the symbol sequence $\underline{d}$, $\underline{\hat{d}}$, per Equation 8.

$$\underline{\hat{d}}=C^H\underline{\hat{s}}. \qquad \text{Equation 8}$$

To implement Equation 5 efficiently, it is desirable to approximate the algorithm properly. To do this, first the Toeplitz matrix $\underline{H}$ extended from the size of L+W−1 by L to the size of Lm+W−1 by Lm and then the square matrix $R_H$ is extended from the size of L to Lm with Lm≧L+W−1, while keeping the banded and Toeplitz structure of the matrices intact. The vector $\underline{r}$ is extended to the length Lm by zero padding, if the length of $\underline{r}$ is less than Lm. The vectors $\underline{s}$ and $\underline{n}$ are effectively automatically extended, due to the padding extension of the other vector/matrix. The extended versions of the matrices and vector $\underline{H}$, $R_H$, $\underline{s}$, $\underline{r}$ and $\underline{n}$ are denoted as $\underline{H}_E$, $R_E$, $\underline{s}_E$, $\underline{r}_E$ and $\underline{n}_E$, respectively. $R_E$ is as follows, $R_E=\underline{H}_E^H\underline{H}_E$.

The last Lm−L elements of $\underline{s}_E$ can all be deemed to be zero, which is essential in understanding the avoidance of the implementation error. With these notations, Equation 5 can be rewritten as Equation 9.

$$\hat{\underline{s}}_E=[R_E+\sigma^2I]^{-1}\underline{H}_E^H\underline{r}_E, \qquad \text{Equation 9}$$

$\underline{r}_E$ is as follows $\underline{r}_E=\underline{H}_E\underline{s}_E+\underline{n}_E$. Because Equation 9 is the extended version of Equation 5, there should not be any differences between them if only the first L elements of $\hat{\underline{s}}_E$ are considered. The last W−1 rows of the $\underline{H}_E$ are cut to get a new square matrix of size Lm, denoted by $\underline{H}_S$. Suppose $R_{Cir}$ and $\underline{H}_{Cir}$ represent the circular counterparts of $R_E$ and $\underline{H}_S$, respectively. From $R_E$ and $\underline{H}_S$, $R_{cir}$ and $\underline{H}_{Cir}$ are constructed as per Equations 10 and 11.

$$R_{Cir} = \begin{bmatrix} R_0 & R_1 & \ldots & R_{W-1} & 0 & 0 & \ldots & & R^*_{W-1} & \ldots & R^*_1 \\ R^*_1 & R_0 & \ldots & & R_{W-1} & 0 & \ldots & & & \ldots & \ldots \\ & R^*_1 & \ldots & R_1 & & R_{W-1} & \ldots & 0 & & & R^*_{W-1} \\ R^*_{W-1} & & \ldots & R_0 & R_1 & & \ldots & 0 & 0 & & \\ 0 & R^*_{W-1} & & R^*_1 & R_0 & \ldots & & R_{W-1} & 0 & & \\ 0 & 0 & \ldots & & R^*_1 & \ldots & \ldots & & R_{W-1} & \ldots & 0 & \ldots \\ \ldots & 0 & \ldots & R^*_{W-1} & & \ldots & \ldots & R_1 & & \ldots & 0 & 0 \\ & & \ldots & 0 & R^*_{W-1} & & \ldots & R_0 & R_1 & & R_{W-1} & 0 \\ & & & 0 & 0 & R^*_{W-1} & & R^*_1 & R_0 & \ldots & & R_{W-1} \\ R_{W-1} & & & & 0 & 0 & \ldots & & R^*_1 & \ldots & R_1 \\ \ldots & \ldots & & & & 0 & \ldots & R^*_{W-1} & & \ldots & R_0 & R_1 \\ R_1 & \ldots & R_{W-1} & & & & \ldots & 0 & 0 & R^*_{W-1} & \ldots & R^*_1 & R_0 \end{bmatrix}$$  Equation 10

$$\underline{H}_{Cir} = \begin{bmatrix} h_0 & & & & & & h_{W-1} & \ldots & h_1 \\ h_1 & h_0 & & & & & & \ldots & \ldots \\ \ldots & h_1 & \ldots & & & & & & h_{W-1} \\ h_{w-1} & \ldots & \ldots & & & & & & \\ & h_{W-1} & \ldots & \ldots & & & & & \\ & & \ldots & \ldots & \ldots & & & & \\ & & & \ldots & \ldots & h_0 & & & \\ & & & & \ldots & \ldots & h_1 & \ldots & \\ & & & & & \ldots & \ldots & \ldots & h_0 \\ & & & & & & h_{W-1} & \ldots & h_1 & h_0 \end{bmatrix}$$  Equation 11

$R_{CIR}$ and $\underline{H}_{CIR}$ both of them are square matrices of size Lm. Because the last Lm−L elements of $\underline{s}_E$ are zero, $\underline{r}_E = \underline{H}_S \underline{s}_E + \underline{n}_E$. Replacing $R_E$, $\underline{H}_E^H$ and $\underline{r}_E$ by $R_{Cir}$, $\underline{H}_{Cir}$ and $\underline{H}_S \underline{s}_E + \underline{n}_E$, respectively, in Equation 9, results in Equation 12.

$$\tilde{s}_E = [R_{Cir} + \sigma^2 I]^{-1} \underline{H}_{Cir}^H \underline{r}_E \quad \text{Equation 12}$$

$$= [R_{Cir} + \sigma^2 I]^{-1} \underline{H}_{Cir}^H \underline{H}_S \underline{s}_E +$$

$$[R_{Cir} + \sigma^2 I]^{-1} \underline{H}_{Cir}^H \underline{n}_E$$

Assuming $\underline{H}_S = \underline{H}_{Cir} - \underline{H}_\Delta$ ($\underline{H}_\Delta$ is an error matrix), Equation 12 can be expressed as Equation 13.

$$\tilde{s}_E = [R_{Cir} + \sigma^2 I]^{-1} R_{Cir} \underline{s}_E + \quad \text{Equation 13}$$

$$[R_{Cir} + \sigma^2 I]^{-1} \underline{H}_{Cir}^H \underline{n}_E - [R_{Cir} + \sigma^2 I]^{-1} \underline{y}$$

$\underline{y} = \underline{H}_{Cir}^H \underline{H}_\Delta \underline{s}_E$ is a column vector of length Lm and the error matrix $\underline{H}_\Delta$ is per Equation 14.

$$\underline{H}_\Delta = \begin{bmatrix} & & & h_{W-1} & \ldots & h_1 \\ & & & & \ldots & \ldots \\ & & & & & h_{W-1} \\ & & & & & \\ & & & & & \\ & & & & & \\ & & & & & \\ & & & & & \\ & & & & & \end{bmatrix}$$  Equation 14

The non-zero elements are located in a triangular area between the first W−1 rows and the last W−1 columns. Without the third term, Equation 13 is very similar to Equation 5 in function when the first L elements are considered. The vector $\underline{y}$ is evaluated. According to the structures of the matrices $\underline{H}_{Cir}^H$ and $\underline{H}_\Delta$, the matrix $\underline{X} = \underline{H}_{Cir}^H \underline{H}_\Delta$ is a square matrix of size Lm with the structure per Equation 15.

$$X = \begin{bmatrix} x & \cdots & x & x & & & & & \\ & x & \cdots & x & & & & & \\ & & \cdots & \cdots & & & & & \\ & & & x & & & & & \\ & & & & & & & & \\ & & & & & x & \cdots & x & x \\ & & & & & \cdots & \cdots & \cdots & \cdots \\ & & & & & x & \cdots & \cdots & x \\ & & & & & x & \cdots & x & x \end{bmatrix} \quad \text{Equation 15}$$

The non-zero elements, denoted by 'x', are located only in two areas: (1) a triangular one between the first W−1 rows and the last W−1 columns and (2) a square one between the last W−1 rows and columns. Because the last (Lm−L) elements of $s_E$ are zero, all elements of $\underline{y} = \underline{H}_{Cir}{}^H \underline{H}_A \underline{s}_E = \underline{X} \underline{s}_E$ are zero if $Lm \geq L+W-1$. When $Lm \geq L+W-1$, Equation 16 results.

$$\tilde{\underline{s}}_E = [R_{Cir} + \sigma^2 I]^{-1} \underline{H}_{Cir}^H \underline{r}_E \quad \text{Equation 16}$$
$$= [R_{Cir} + \sigma^2 I]^{-1} R_{Cir} \underline{s}_E + [R_{Cir} + \sigma^2 I]^{-1} \underline{H}_{Cir}^H \underline{n}_E,$$

Equation 16 is a good approximation of Equation 5, when taking only the first L estimates into account. The first portion of Equation 16 is referred to as the EA. Similarly, the head and tail parts of a data field are affected significantly by replacing Toeplitz matrices with their circulant counterparts in Equation 5 directly without matrix extension. The implementation algorithm without matrix extension is called the truncated algorithm (TA). With TA, Equations 9 to 15 are still valid, except that Lm=L. The reason consists of two aspects: First, when replacing $\underline{H}$ in Equation 5 with $\underline{H}_{Cir}$ of size L, the length of the received signal vector $\underline{r}$ is preferably limited to be L. This results in the loss of multipath signals of the data in the tail part of a data field. Therefore, the estimates of the affected data become very poor. Second, when Lm=L, $\underline{y}$ is a column vector of length L, in which the first and last W−1 elements are non-zero elements. Because $B_{Cir} = R_{Cir} + \sigma^2 I$ is of banded structure along the diagonal, the inverse of $B_{Cir}$ has approximately the same structure. Therefore, the relative large values of the column vector $\underline{z} = B_{Cir}^{-1} \underline{y}$ are located in the first and last W−1 columns and affect the estimates of $\hat{\underline{s}}$ both in the head and tail areas. For the second reason, the number of the affected estimates depends on the channel response length W. The larger the delay spread of a channel (W) is, the more the estimates are affected.

Additionally, the implementation algorithm given by Equation 16 can be extended to support over-sampling. With over-sampling, the effect of timing error is mitigated. Assuming sampling rate is M times of chip rate, M received signal vectors, denoted by $\underline{r}_E^{(m)}$ for m=1,2, . . . , M, are available. However, the time interval between two successive samples in each $\underline{r}_E^{(m)}$ is the chip duration. Similarly, there are also M sets of channel response, denoted by $\underline{h}^{(m)} = (h_{0,m}, h_{1,m}, \ldots, h_{W-1,m})$ for m=1,2, . . . , M. With these channel responses, a total of 2M circulant matrices $\underline{H}_{Cir,m}$ and $R_{Cir,m}$ for m=1, 2, . . . , M can be constructed. Accordingly, the implementation algorithm with over-sampling can be written as per Equation 17.

$$\tilde{\underline{s}}_E = \left[ \sum_{m=1}^{M} \left( R_{Cir,m} + \frac{1}{M} \sigma_m^2 I \right) \right]^{-1} \sum_{m=1}^{M} H_{Cir,m}^H \underline{r}_E^{(m)} \quad \text{Equation 17}$$

$\sigma_m^2$ is the noise variance corresponding to the mth input vector $\underline{r}_E^{(m)}$.

Before implementation, the value of Lm is determined. Because Lm is larger than L+W−1, Lm is chosen as per Equation 18.

$$Lm = \max\{L\} + \max\{W\} + \epsilon, \quad \text{Equation 18}$$

max{.} is the maximum value of {.} and ε is a positive integer used to let Lm a good length for FFT implementation. For example, in UTRA wideband TDD system (WTDD), max {L}=1104, max {W}=114. ε is chosen to be equal to 14 to let Lm=1232. With this length, FFT can be performed very efficiently by PFA because 1232 can be factored as 1232=7×11×16. With complex input, the real multiplies and adds required by the 1232-point FFT are 8836 and 44228, respectively. From Equation 18, Lm depends on specific system design. However, the implementation approach described herein is applicable to any other TDD systems such as UTRA narrowband TDD system (TD-SCDMA).

In the following, the preferred implementation procedure of Equation 17 is described as method steps under the assumption that the FFT length P equals the selected Lm.

The first column g of the circulant matrix $$\sum_{m=1}^{M} \left( R_{Cir,m} + \frac{1}{M} \sigma_m^2 I \right)$$

is computed based on the estimated channel response and noise power, yielding Equation 19.

$$\underline{g} = \sum_{m=1}^{M} \begin{pmatrix} R_{0,m} + \frac{1}{M} \sigma_m^2, R_{1,m}^*, \ldots, R_{W-1,m}^*, \\ 0, \ldots, 0, R_{W-1,m}, \ldots, R_{1,m} \end{pmatrix}^T. \quad \text{Equation 19}$$

The circulant matrix $$\sum_{m=1}^{M} \left( R_{Cir,m} + \frac{1}{M} \sigma_m^2 I \right)$$

in the FFT domain is decomposed, yielding Equation 20.

$$\sum_{m=1}^{M} \left( R_{Cir,m} + \frac{1}{M} \sigma_m^2 I \right) = D_P^{-1} \Lambda_R D_P, \quad \text{Equation 20}$$

$D_P$ and $D_P^{-1}$ are the P-point FFT and inverse FFT (IFFY) matrices defined as per Equation 21.

$$D_P \underline{x} = \sum_{n=0}^{P-1} x(n) e^{-j\frac{2\pi kn}{P}} \qquad \text{Equation 21}$$

and $$D_P^{-1} \underline{x} = \frac{1}{P} \sum_{n=0}^{P-1} x(n) e^{j\frac{2\pi kn}{P}},$$

for $k = 0, 1, \ldots, P-1$, $\Lambda_R$ is a diagonal matrix of size P, whose diagonal is $D_P \underline{g}$. $\Lambda_R$ is denoted as $\Lambda_R = \text{diag}(D_P \underline{g})$. The relation between $D_P^{-1}$ and $D_P$ is $D_P^{-1} = (1/P) D_P^*$.

The circulant matrix $\underline{H}_{Cir,m}$ is decomposed in the FFT domain, yielding Equation 22.

$$\underline{H}_{Cir,m} = D_P^{-1} \Lambda_{H_m} D_P, \qquad \text{Equation 22}$$

$\Lambda H_m$ is a diagonal matrix of size P, whose diagonal is $D_P \underline{u}_m$ with $\underline{u}_m = [h_{0,m}, h_{1,m}, \ldots, h_{W-1,m}, 0, \ldots, 0]^T$ being the first column of $\underline{H}_{Cir,m}$.

The received signal vector $\underline{r}^{(m)}$ is reconstructed by zero padding to get the extended signal vector $\underline{r}_E^{(m)}$ of length P.

The composite spread signal vector $\underline{\tilde{s}}_E$ is computed yielding Equation 23 or Equation 24 in the frequency domain.

$$\underline{\tilde{s}}_E = \left[ \sum_{m=1}^{M} (R_{Cir,m} + \sigma_m^2 I) \right]^{-1} \sum_{m=1}^{M} H_{Cir,m}^H \underline{r}_E^{(m)} \qquad \text{Equation 23}$$

$$= D_P^{-1} \Lambda_R^{-1} \sum_{m=1}^{M} \Lambda_{H_m}^* D_P \underline{r}_E^{(m)}$$

$$D_P \underline{\tilde{s}}_E = \left( \sum_{m=1}^{M} (D_P \underline{u}_m)^* \otimes (D_P \underline{r}_E^{(m)}) \right) / (D_P \underline{g}) \qquad \text{Equation 24}$$

and $$\underline{\tilde{s}}_E = D_P^{-1} \{ D_P \underline{\tilde{s}}_E \},$$

The operators ⊗ and / denote the vector multiplication and division performed on element-by-element basis, respectively. The last P-L elements of $\underline{\tilde{s}}_E$ are rounded off to get another vector $\underline{\hat{s}}$ of length L.

The composite spread signal $\underline{\hat{s}}$ is despread, yielding $\underline{\tilde{s}}_E$.

FIG. 1 is a block diagram of a system 100. For an oversampled system, M sampled sequences are processed, $\underline{r}^{(1)} \ldots \underline{r}^{(M)}$ and $\underline{h}^{(1)} \ldots \underline{h}^{(M)}$. For a chip rate sampled sequence, only one sampled sequence is processed, $\underline{r}^{(1)}$ and $\underline{h}^{(1)}$. The system 100 receives the signals $r^{(1)} \ldots \underline{r}^{(M)}$ at inputs $105_1 \ldots 105_M$ (105) and receives the channel impulse response $\underline{h}^{(1)} \ldots \underline{h}^{(M)}$ at inputs $110_1 \ldots 110_M$ (110). The received signals $r^{(1)} \ldots \underline{r}^{(M)}$ are zero padded in the tail by zero padding devices $115_1 \ldots 115_M$ (115) until the length of each sequence achieves length Lm. The extended sequences after zero padding are denoted as $\underline{r}^{(1)}_E \ldots \underline{r}_E^{(M)}$ which exits block 115 via outputs $120_1 \ldots 120_M$ (120). The channel impulse responses $\underline{h}^{(1)} \ldots \underline{h}^{(M)}$ are zero padded in the tail by zero padding in the tail by zero padding devices $125_1 \ldots 125_M$ (125) until the length of the extended sequence achieves length Lm. The extended sequences after zero padding are denoted as $\underline{u}_1 \ldots \underline{u}_M$ which exits the zero padding devices 125 via outputs $130_1 \ldots 130_M$ (130). DFT or FFT blocks $135_1 \ldots 135_M$ (135) receive the outputs 120 from zero padding devices 115 and perform DFT or FFT on $\underline{r}_E^{(1)} \ldots \underline{r}_E^{(M)}$, $F(\underline{r}_E^{(1)}) \ldots F(\underline{r}_E^{(M)})$. DFT or FFT blocks $140_1 \ldots 140_M$ (140) receive the outputs 130 from zero padding devices 125 and perform DFT or FFT on $\underline{u}_1 \ldots \underline{u}_M$, $F(\underline{u}_1) \ldots F(\underline{u}_M)$. Conjugate devices $145_1 \ldots 145_M$ (145) conjugate $F(\underline{u}_1) \ldots F(\underline{u}_M)$, $F(\underline{u}_1)^* \ldots F(\underline{u}_M)^*$. Element-to-element multipliers $150_1 \ldots 150_M$ (150) multiply the sequences $F(\underline{r}_E^{(1)}) \ldots F(\underline{r}_E^{(M)})$ and $F(\underline{u}_1)^* \ldots F(\underline{u}_M)^*$, $F(\underline{r}_E^{(1)}) \cdot \ldots F(\underline{u}_1)^* \ldots F(\underline{r}_E^{(M)}) \cdot F(\underline{u}_{M1})^*$.

All of the M sampled sequence results are added element-to-element by adder 175 with $$\sum_{m=1}^{M} F(\underline{r}_E^{(m)}) \cdot F(\underline{u}_m)^*,$$

$M = 1, 2, \ldots, M$. A channel correlation vector $\underline{g}$ is generated by a channel correlation generator 180 using extended channel response sequences $\underline{u}_1, \ldots, \underline{u}_M$, with $$\underline{g} = \sum_{m=1}^{M} \underline{g}^{(m)}.$$

Using a MMSE algorithm, a noise variance $\sigma_m^2$ is added to the first element of vector $\underline{g}^{(m)}$. Vector $\underline{g}^{(m)}$ is generated using $\underline{u}_m$. The i-th element of the vectors $\underline{g}^{(m)}$ for the m-th sampled sequence is computed by: circulating the conjugate vector $\underline{u}_m^*$ by downshifting i−1 elements and multiplying the shifted vector $\underline{u}_m^*$ by the vector $\underline{u}_m$ such that $\underline{g}^{(m)}(i) = \underline{u}_{m,(i-1)shifts}^H \underline{u}_m$, $m = 1, 2, \ldots, M$. A DFT or FFT device 185 performs a DFT or FFT on channel correlation vector $\underline{g}$, $F(\underline{g})$. Divider 190 divides element-by-element the output of adder 175 by the output of DFT or FFT device 185, such that $$\frac{\sum_{m=1}^{M} F(\underline{r}_E^{(m)}) \cdot F(\underline{u}_m)^*}{F(\underline{g})}.$$

Inverse DFT or inverse FFT device 194 is performed on the output of divider 190, such that $$F^{-1} \left( \frac{\sum_{m=1}^{M} F(\underline{r}_E^{(m)}) \cdot F(\underline{u}_m)^*}{F(\underline{g})} \right).$$

The output of the inverse DFT or inverse FFT device 194 is an estimate of the composite spread signal $\underline{\hat{s}}$. Despreader 198 despreads the output of inverse DFT or inverse FFT device 194 to obtain the estimated data symbols $\hat{d}$.

Figures 2, 2A:
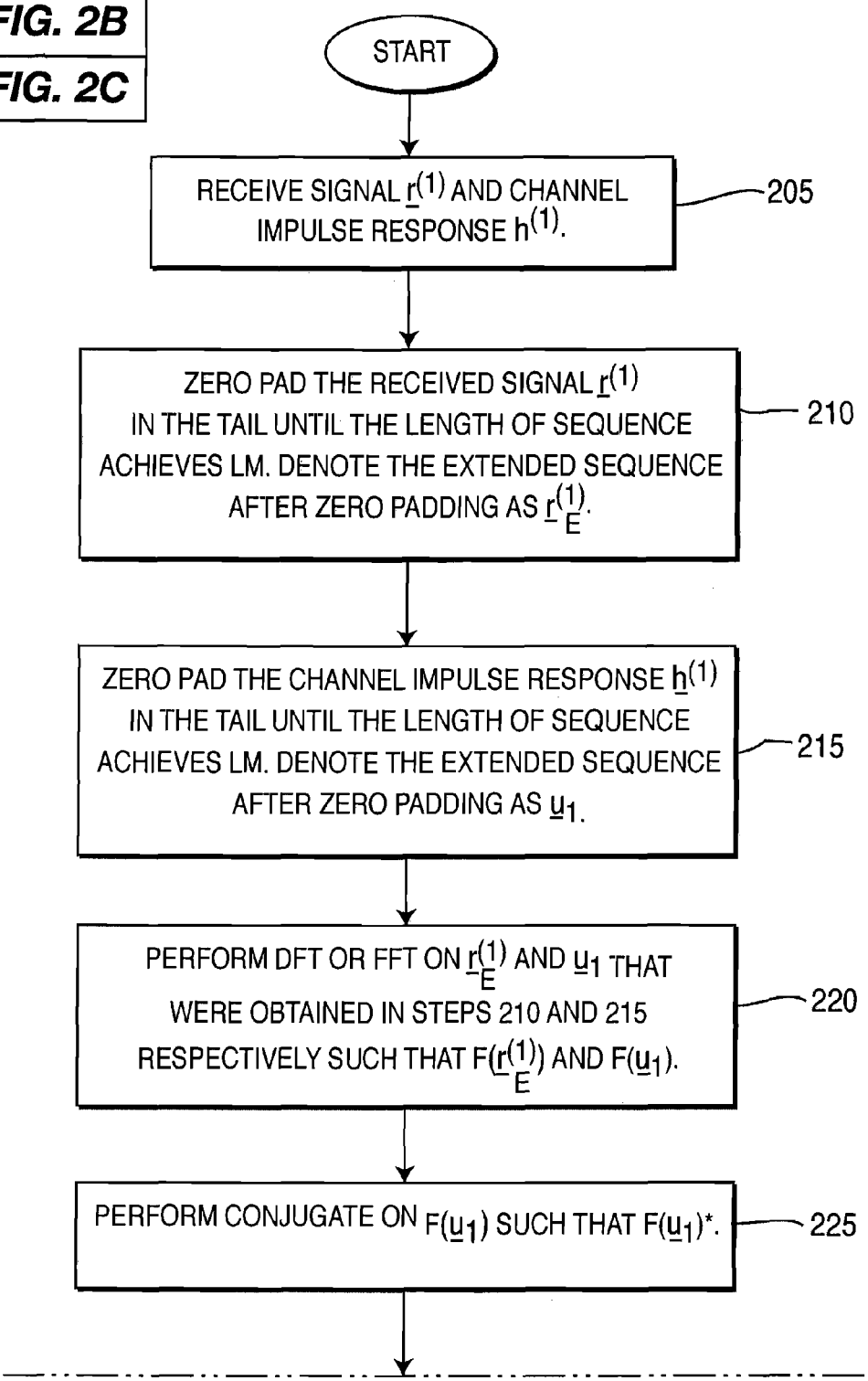
FIGS. 2A, 2B and 2C, taken together, are a flow chart illustrating the method steps implemented by the EA of FIG. 1.
Figure 2B:
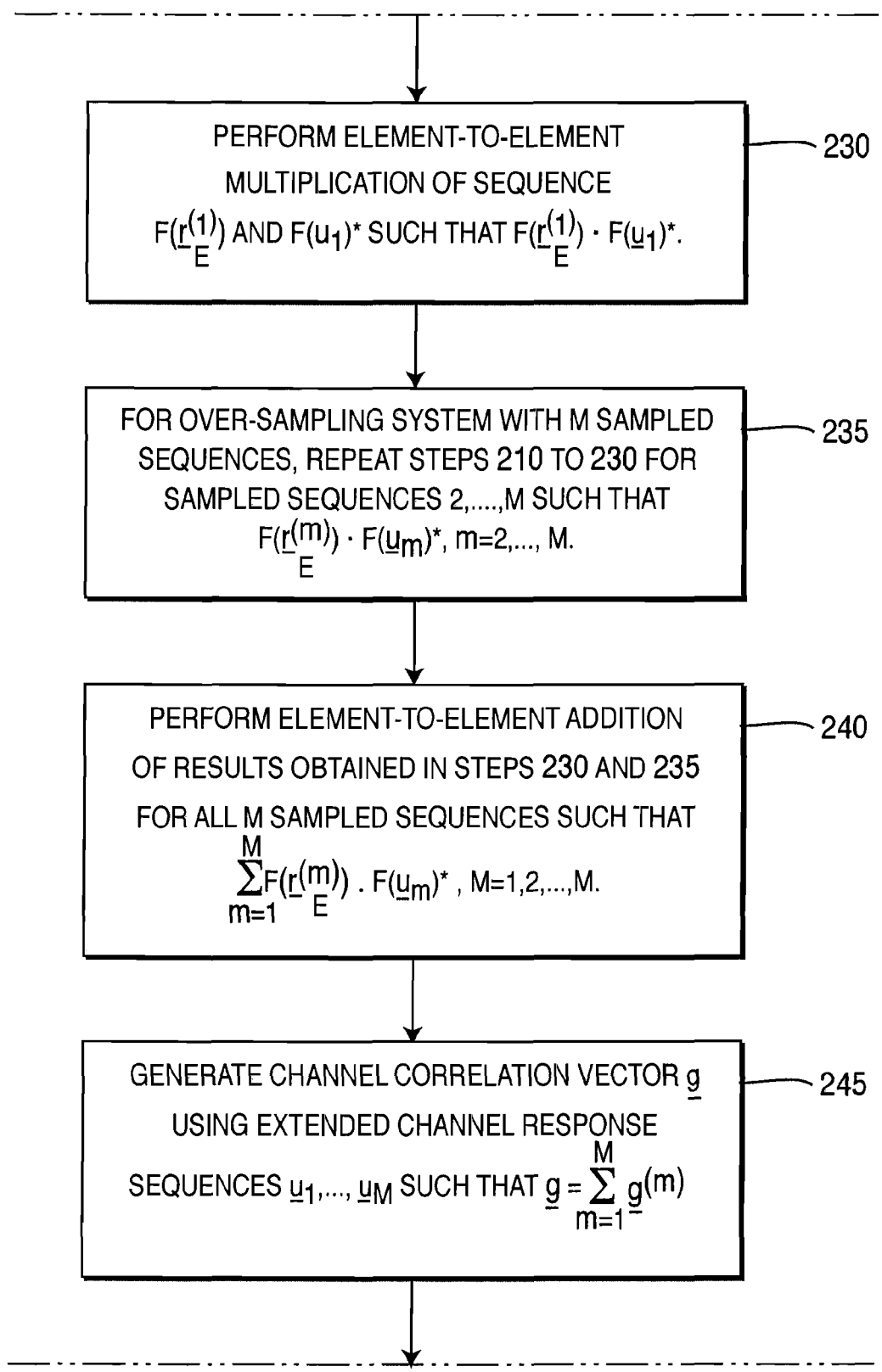
Figure 2C:
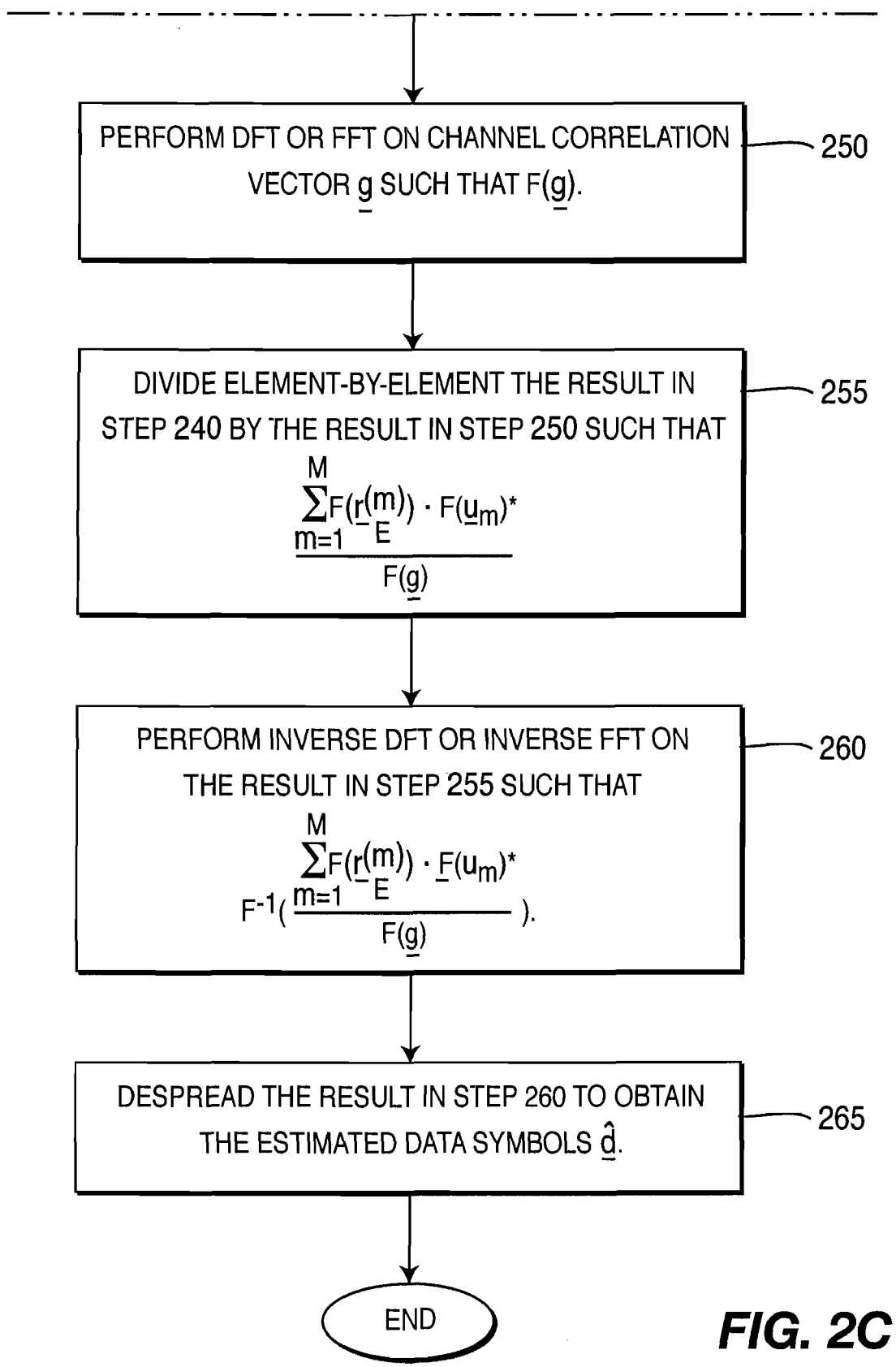

Referring to FIGS. 2A, 2B and 2C, the procedure for performing an EA in accordance with a preferred embodiment of the present invention is described as follows:

In step 205, system 100 receives signal $\underline{r}^{(1)}$ at input 105 and receives the channel impulse response $\underline{h}^{(1)}$ at input 110.

In step 210, the received signal $\underline{r}^{(1)}$ is zero padded in the tail by zero padding device 115 until the length of sequence achieves length Lm. The extended sequence after zero padding is denoted as $\underline{r}_E^{(1)}$ which exits block 115 via output 120.

In step 215, the channel impulse response $\underline{h}^{(1)}$ is zero padded in the tail by zero padding device 125 until the length of the extended sequence achieves length Lm. The extended sequence after zero padding is denoted as $\underline{u}_1$ which exits the zero padding device 125 via output 130.

In step 220, DFT or FFT block 135 receives the output 120 from zero padding device 115 and performs DFT or FFT on $\underline{r}_E^{(1)}$ such that $F(\underline{r}_E^{(1)})$. DFT or FFT block 140 receives the output 130 from zero padding device 125 and performs DFT or FFT on $\underline{u}_1$, $F(\underline{u}_1)$.

In step 225, conjugate device 145 conjugates $F(\underline{u}_1)$, $F(\underline{u}_1)^*$.

In step 230, element-to-element multiplier 150 multiplies the sequences $F(\underline{r}_E^{(1)})$ and $F(\underline{u}_1)^*$ producing $F(\underline{r}_E^{(1)}) \cdot F(\underline{u}_1)^*$.

In step 235, for over-sampling system with M sampled sequences, steps 210 to 230 are repeated for sampled sequences 2, . . . , M, $F(\underline{r}_E^{(m)}) \cdot F(\underline{u}_m)^*$, for m=2, . . . , M.

In step 240, all of the M sampled sequence results obtained in steps 230 and 235 are added element-to-element by adder 175, $$\sum_{m=1}^{M} F(\underline{r}_E^{(m)}) \cdot F(\underline{u}_m)^*,$$

for m=1,2, . . . , M.

In step 245, a channel correlation vector $\underline{g}$ is generated by a channel correlation generator 180 using extended channel response sequences $\underline{u}_1, \ldots, \underline{u}_M$, such that $$\underline{g} = \sum_{m=1}^{M} \underline{g}^{(m)}.$$

In step 250, a DFT or FFT 185 performs DFT or FFT on channel correlation vector $\underline{g}$, $F(\underline{g})$.

In step 255, divider 190 divides element-by-element the result in step 240 by the result in step 250, $$\frac{\sum_{m=1}^{M} F(\underline{r}_E^{(m)}) \cdot F(\underline{u}_m)^*}{F(\underline{g})}.$$

In step 260, an inverse DFT or inverse FFT 194 is performed on the result of step 255, $$F^{-1}\left(\frac{\sum_{m=1}^{M} F(\underline{r}_E^{(m)}) \cdot F(\underline{u}_m)^*}{F(\underline{g})}\right),$$

producing the estimated composite spread signal, $\hat{\underline{S}}$.

In step 265, despreader 198 despreads the output of step 260 to obtain the estimated data symbols $\underline{d}$.

In simulation, the described model is based on K=12, and that codes are transmitted with equal code power and the effects of midamble signal on the second data field have been cancelled completely. Each code has a SF=16. A total 1104 chips in a data field are assumed (burst type 2 in WTDD). Because there are two data fields in a timeslot in WTDD, the last 8 bits (4 complex symbols) of the first data field, and the first 8 bits of the second data field are defined as TFCI-1 and TFCI-2, respectively. Two algorithms, truncated algorithm (TA) and extended algorithm (EA), are employed. The raw bit error rates of TFCI-1, TFCI-2 as well as all bits are evaluated for both EA and TA with chip rate sampling. 1000 timeslots are accumulated for each SNR point. The simulations are run over the WG4 Case-1 and 2 channels.

Figure 3:
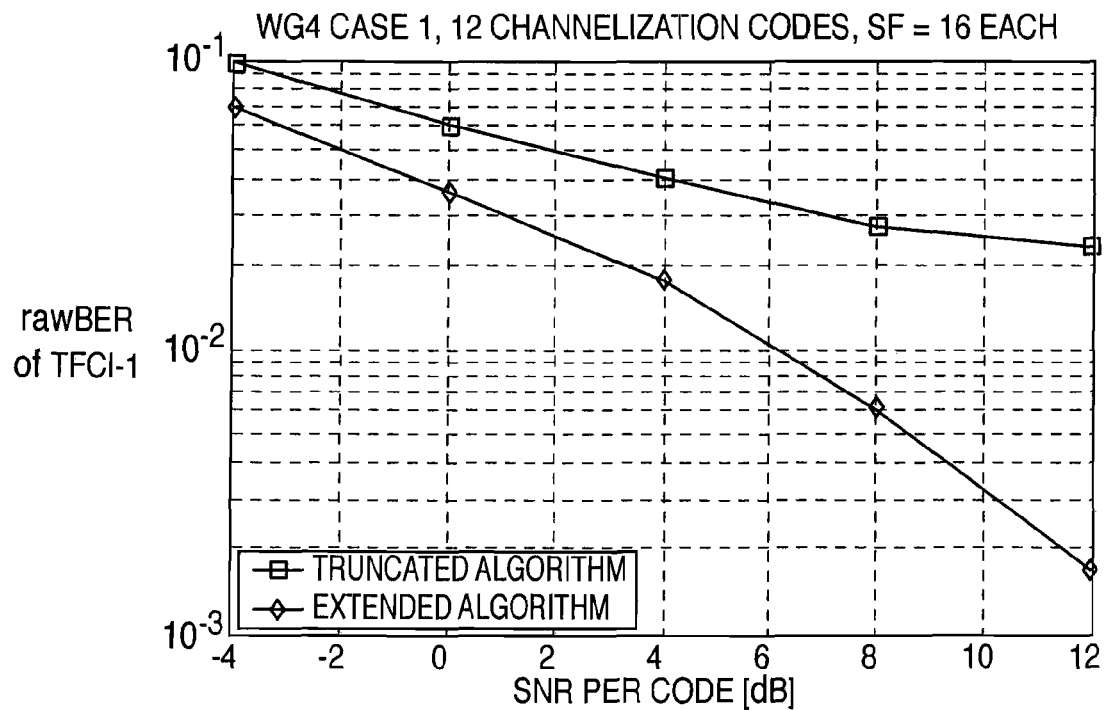
FIG. 3 is an illustration of raw block error rate (BER) of TFCI-1 versus signal to noise (SNR) in Case 1 channel (TFCI represents transport format combination indicator)
Figure 4:
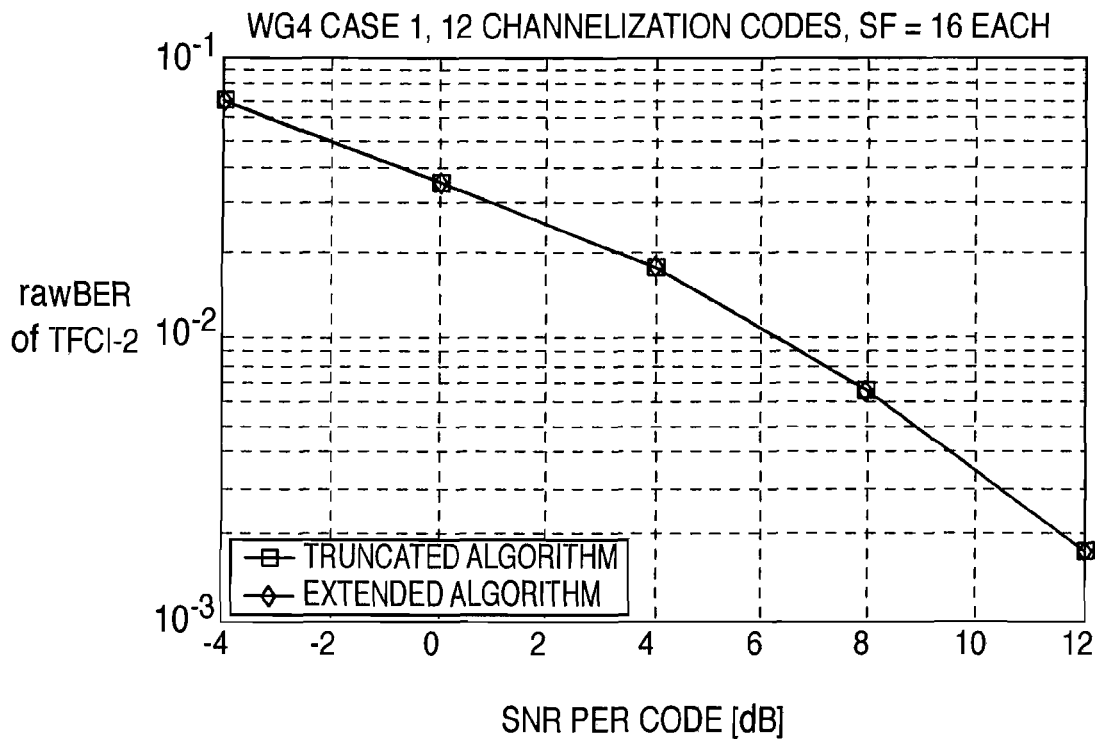
FIG. 4 is an illustration of raw BER of TFCI-2 versus signal to noise ratio (SNR) per code in Case 1 channel.

FIGS. 3 and 4 present the performance of TFCI-1 and TFCI-2 in WG4 Case-1 channel when EA and TA are used. A significant performance gap between EA and TA is found as shown in FIG. 3. Because TFCI-1 locates in the tail part of the first data field, the performance degradation of the TFCI-1 with TA results from two reasons: (1) loss of TFCI-1 multipath signals and (2) Toeplitz to circulant matrix replacement in the implementation because the channel response length W is small (W=4) for WG4 Case-1 channel. This conclusion is confirmed by the results shown in FIG. 4. Because the performance in FIG. 4 is for the TFCI-2 which locates in the head part of the second data field, the most probable reason that affects its performance with TA must be the second one: matrix replacement. From FIG. 4, it can be seen that the performance of TFCI-2 with EA and TA is nearly identical. This implies that the estimate error introduced to the TA through the matrix replacement is very limited because of the small value of W for WG4 Case-1 channel. For example, when W=4, only a quarter of the first symbol is affected because of the relationship SF=16.

Figure 5:
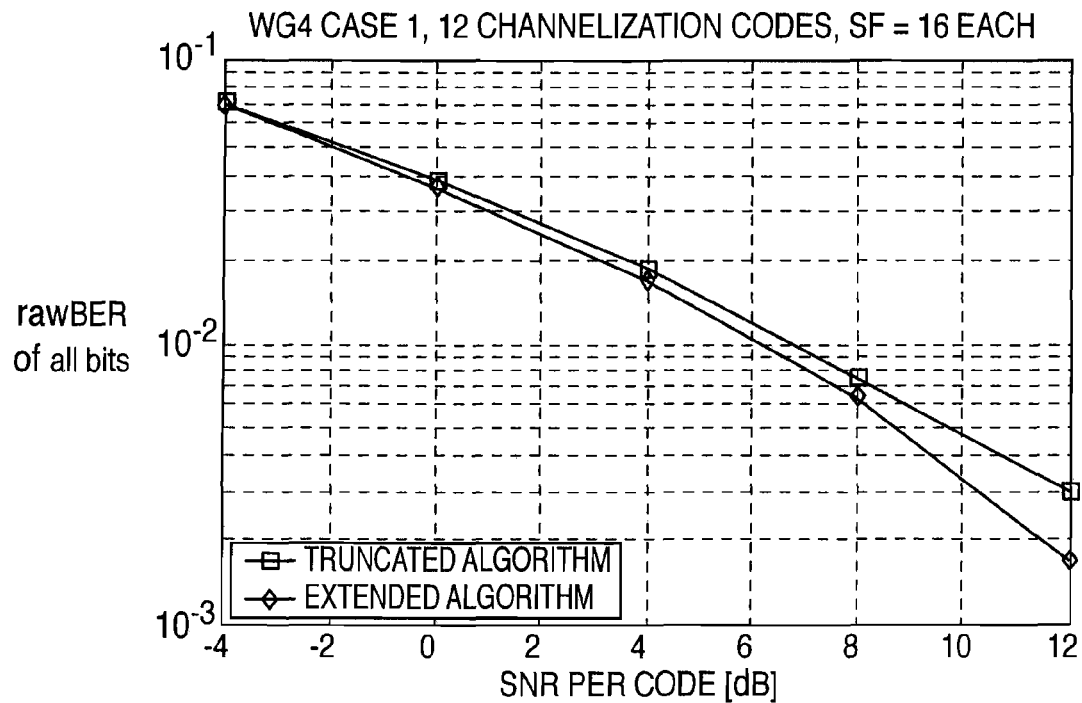
FIG. 5 is an illustration of raw BER of all bits versus SNR per code in Case 1 channel.

FIG. 5 shows the raw BER of all bits when EA and TA are assumed. Comparing with EA, the major contributor to the loss of raw BER of all bits with TA is the TFCI-1 in each timeslot.

Figure 6:
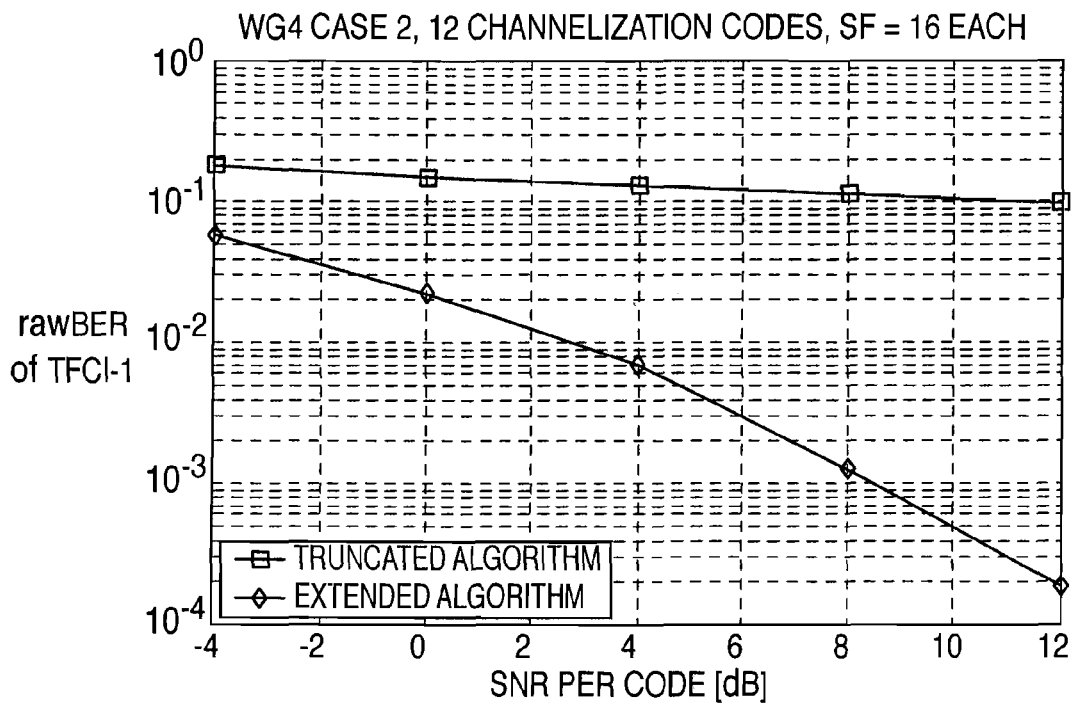
FIG. 6 is an illustration of raw BER of TFCI-1 versus SNR per code in Case-2 channel.
Figure 7:
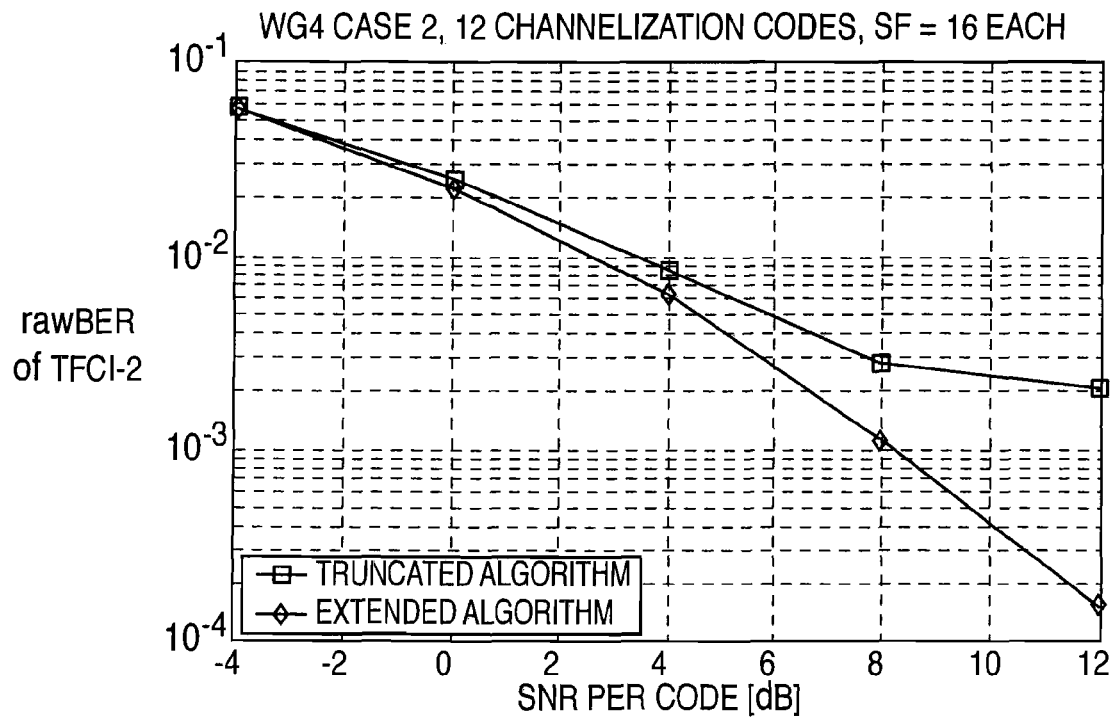
FIG. 7 is an illustration of raw BER of TFCI-2 versus SNR per code in Case-2 channel.
Figure 8:
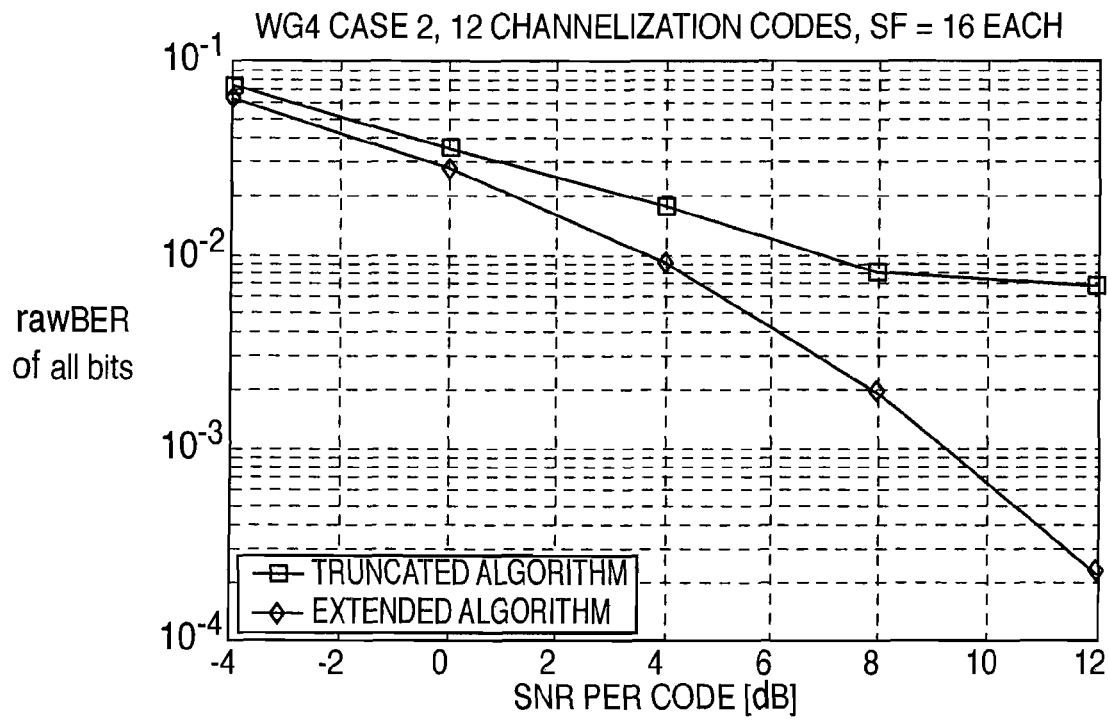
FIG. 8 is an illustration of all bits versus SNR per code in Case-2 channel.

FIGS. 6 and 7 show the performance of TFCI-1 and TFCI-2 in WG4 Case-2 channel when EA and TA are adopted. Case-2 channel differs from Case-1 channel by much larger delay spread (W=46) as well as stronger power of multipath signals. From FIG. 6, the TFCI-1 with TA is seen to be almost destroyed both due to the loss of its multipath signals and matrix replacement. In FIG. 7, the performance of TFCI-2 with TA is still much poorer than that with EA, which is due to the matrix replacement only. In this case, W=46 and hence the first three symbols (six bits) will be affected significantly. FIG. 8 presents the raw BER of all bits for EA and TA in Case-2 channel.

When a truncated algorithm (TA) is used in the implementation, the data in the head and tail parts of a data field are affected significantly by two aspects: the lost information of multipath signals due to cutting the channel response matrix to be square and the error due to replacing Toeplitz matrices with circulant ones. To overcome this problem, an EA is used. The EA avoids implementation errors by choosing the size of the extended matrices properly. To implement the EA with DFT, a dynamic-length EA is desirable, while for an EA with FFT of PFA, a fixed-length approach is more appropriate. In the fixed-length approach, the computation complexity can be minimized through choosing a proper PFA length in a certain range. The fixed-length EA makes different data block lengths (burst types) be supported by one algorithm only. The fixed length EA simplifies the implementation further since one piece of hardware is needed to cope with the single algorithm. Simulation results show that the performance of the EA is much better than that of the TA, especially for the data in the head and tail parts of data fields.

The invention can be implemented at a base station or wireless transmit/receive unit (WTRU). Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a base station, Node-B, site controller, access point or other interfacing device in a wireless environment.

Figure 9A:
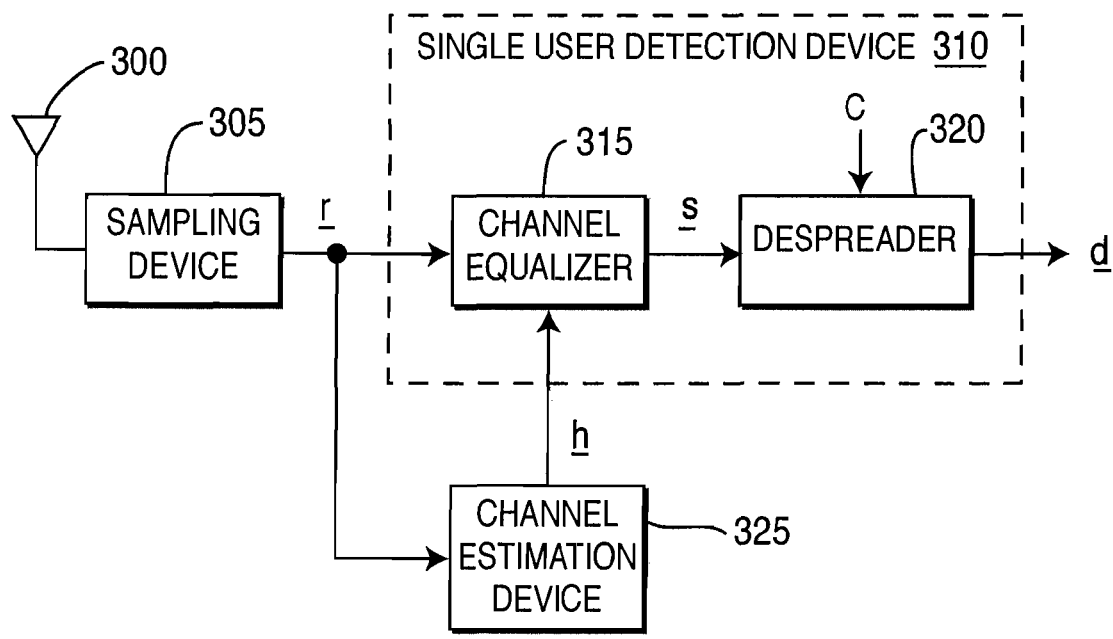
FIGS. 9A and 9B are receiver implementations using extended algorithm data detection.
Figure 9B:
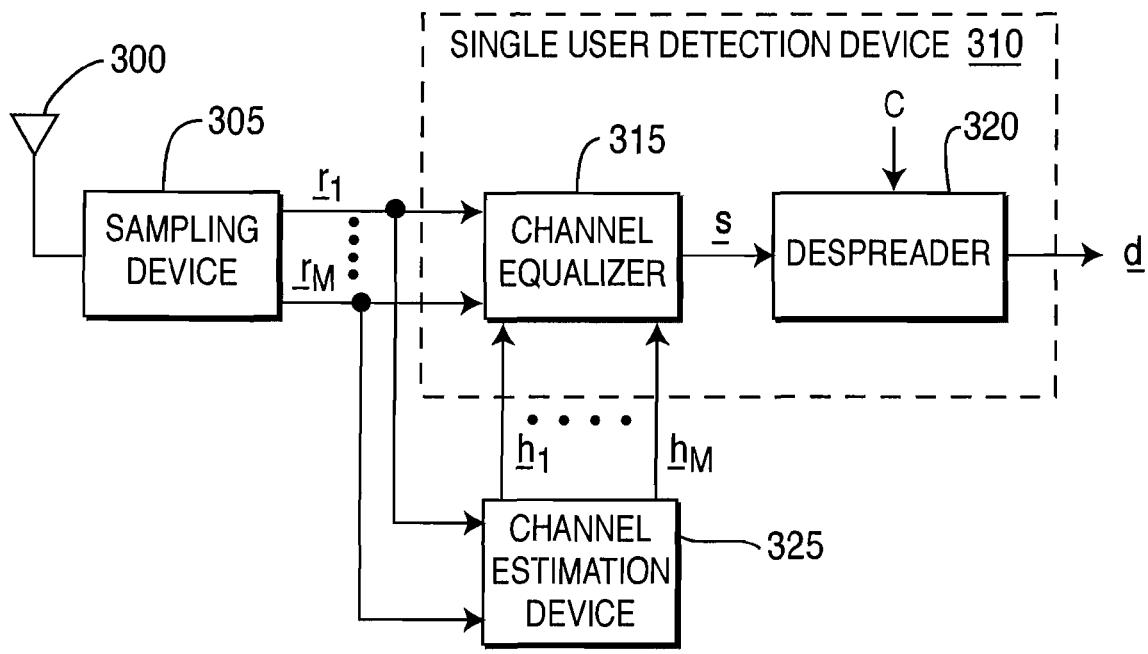

FIGS. 9A and 9B are receiver implementations using extended algorithm data detection. Referring to FIG. 9A, radio frequency (RF) signals are received by an antenna 300. A sampling device 305 produces a chip rate received vector $\underline{r}$. A channel estimation device 325 determines a channel impulse response $\underline{h}$ for the received vector. A single user detection device 310 uses the received vector $\underline{r}$ and the channel impulse response $\underline{h}$ to estimate the data vector $\underline{d}$ using the extended algorithm. The received vector $\underline{r}$ is processed by a channel equalizer 315 using the channel impulse response $\underline{h}$ to determine a spread vector $\underline{s}$. A despreader 320 using the transmission codes C despreads the spread vector $\underline{s}$ to estimate the data vector $\underline{d}$.

Referring to FIG. 9B, RF signals are received by an antenna 300. A sampling device 305 samples the received signal at a multiple M of the chip rate, producing M received vector sequences $\underline{r}_1 \ldots \underline{r}_m$. A channel estimation device 325 determines a channel impulse response $\underline{h}_1 \ldots \underline{h}_m$ corresponding to each received vector $\underline{r}_1 \ldots \underline{r}_m$. A single user detection device 310 uses the received vector sequences $\underline{r}_1 \ldots \underline{r}_m$ and the channel impulse responses $\underline{h}_1 \ldots \underline{h}_m$ to estimate the data vector $\underline{d}$ using the extended algorithm. The received vectors $\underline{r}_1 \ldots \underline{r}_m$ are processed by a channel equalizer 315 using the channel impulse responses $\underline{h}_1 \ldots \underline{h}_m$ to determine a spread vector $\underline{S}$. A despreader 320 using the transmission codes C despreads the spread vector $\underline{S}$ to estimate the data vector $\underline{d}$.

While the present invention has been described in terms of the preferred embodiment, other variations which are within the scope of the invention as outlined in the claims below will be apparent to those skilled in the art.

What is claimed is:

1. A wireless communication apparatus for performing an extended algorithm (EA) with over-sampling, the apparatus comprising:
   a first input receiving a signal $\underline{r}^{(1)}$;
   a second input for receiving a channel impulse response $\underline{h}^{(1)}$;
   a first zero padding unit for zero padding the received signal $\underline{r}^{(1)}$ in the tail until the length of sequence achieves length Lm and output a first output $\underline{r}_E^{(1)}$;
   a second zero padding unit for zero padding the channel impulse response $\underline{h}^{(1)}$ in the tail until the length of the extended sequence achieves length Lm and outputting a second output $\underline{u}_1$;
   a first processing unit for performing a discrete Fourier Transform (DFT) or fast Fourier transform (FFT) on $\underline{r}_E^{(1)}$ such that $F(\underline{r}_E^{(1)})$;
   a second processing unit for performing a DFT or FFT on $\underline{u}_1$ such that $F(\underline{u}_1)$;
   a conjugate unit for conjugating $F(\underline{u}_1)$ such that $F(\underline{u}_1)^*$; and
   a multiplier for multiplying the sequences $F(\underline{r}_E^{(1)})$ and $F(\underline{u}_1)^*$ such that $F(\underline{r}_E^{(1)}) \cdot F(\underline{u}_1)^*$, wherein for M sampled sequences, sampled sequences $2, \ldots, M$ are processed such that $F(\underline{r}_E^{(m)}) \cdot F(\underline{u}_m)^*$, $m=2, \ldots, M$.

2. The apparatus of claim 1 further comprising:
   an adder for adding all of the M sampled sequence results element-to-element such that $$\sum_{m=1}^{M} F(r_E^{(m)}) \cdot F(u_m)^*,$$

$M=1, 2, \ldots, M$.

3. The apparatus of claim 2 wherein the apparatus is further configured to:
   generate a channel correlation vector $\underline{g}$ using extended channel response sequences $\underline{u}_1 \ldots \underline{u}_M$ such that $$\underline{g} = \sum_{m=1}^{M} \underline{g}^{(m)};$$

and
   perform DFT or FFT on channel correlation vector $\underline{g}$ such that $F(\underline{g})$.

4. The apparatus of claim 1 wherein the apparatus is a wireless transmit/receive unit (WTRU).

5. The apparatus of claim 1 wherein the apparatus is a base station.

6. The apparatus of claim 1 wherein the apparatus is a receiver.

* * * * *

UNITED STATES PATENT AND TRADEMARK OFFICE
CERTIFICATE OF CORRECTION

PATENT NO. : 7,539,238 B2 Page 1 of 2
APPLICATION NO. : 12/173163
DATED : March 26, 2009
INVENTOR(S) : Pan et al.

It is certified that error appears in the above-identified patent and that said Letters Patent is hereby corrected as shown below:

IN THE SPECIFICATION

At column 2, line 45, after the symbol "$\underline{r}$, " delete "is" and insert therefor --its--.

At column 2, line 46, after the symbol "$\underline{s}$, " delete "passed" and insert therefor --is passed--.

At column 3, line 65, after the word "from" delete "r = $\underline{Hs}$ + $\underline{n}$" and insert therefor --$\underline{r}$ = $\underline{Hs}$ + $\underline{n}$--.

At column 4, Equation (7), column 10, row 6, delete "$R^{*}_{W-1}$" and insert therefor --$R_{W-1}$--.

At column 4, Equation (7), column 12, row 8, delete "$R^{*}_{W-1}$" and insert therefor --$R_{W-1}$--.

At column 4, Equation (7), column 13, row 9, delete "$R^{*}_{W-1}$" and insert therefor --$R_{W-1}$--.

At column 5, line 44, after "by $R_{Cir}$," delete "$\underline{H}_{Cir}$" and insert therefor --$\underline{H}_{Cir}^{H}$--.

At column 7, line 22, before the words "are zero" delete "$\underline{s}_E$" and insert therefor --$\underline{s}_E$--.

At column 8, delete Equation 18 and insert therefor --$Lm = \max\{L\} + \max\{W\} + \varepsilon$--.

At column 8, line 17, before the words "is a" delete "$\epsilon$" and insert therefor --$\varepsilon$--.

At column 8, line 20, before the words "is chosen" delete "$\epsilon$" and insert therefor --$\varepsilon$--.

At column 9, line 1, after "FFT" delete "(IFFY)" and insert therefor --(IFFT)--.

At column 9, line 54, after the word "signals" delete "$r^{(1)}$" and insert therefor --$\underline{r}^{(1)}$--.

At column 9, line 56, after the word "signals" delete "$r^{(1)}$" and insert therefor --$\underline{r}^{(1)}$--.

UNITED STATES PATENT AND TRADEMARK OFFICE
CERTIFICATE OF CORRECTION

PATENT NO. : 7,539,238 B2
APPLICATION NO. : 12/173163
DATED : March 26, 2009
INVENTOR(S) : Pan et al.

It is certified that error appears in the above-identified patent and that said Letters Patent is hereby corrected as shown below:

At column 9, lines 62 - 63, after the word "padding" delete "in the tail by zero padding".

At column 11, line 13, after the word "producing" delete "$F(\underline{r}_E^{(1)} \cdot F(\underline{u}_1)^*$." and insert therefor --$F(\underline{r}_E^{(1)}) \cdot F(\underline{u}_1)^*$.--.

Signed and Sealed this

Third Day of November, 2009

David J. Kappos
*Director of the United States Patent and Trademark Office*